(12) United States Patent
Gravel et al.

(10) Patent No.: US 9,864,369 B2
(45) Date of Patent: Jan. 9, 2018

(54) VERTICAL BALL CANNON WITH SLIDING DEFLECTOR MOUNTED ON MANEUVERABLE ROBOTIC PLATFORM

(71) Applicant: Cardinal Gibbons High School, Raleigh, NC (US)

(72) Inventors: Benjamin Gerard Gravel, Cary, NC (US); Brian Alexander Nelson, Cary, NC (US); Sean Michael McDonald, Cary, NC (US); Jordan Dominic Salamido, Cary, NC (US); Sean Michael Greene, Raleigh, NC (US); Christopher John Young, Durham, NC (US); Oliver Dacey McCann, Cary, NC (US); Kirsten Joanna Keleher, Raleigh, NC (US); Sunkeun Lee, Raleigh, NC (US); Miguel Douglas Chavez, Raleigh, NC (US); Evan Patrick Elezaj, Apex, NC (US); Reade Lawrence McBride, Raleigh, NC (US); Christopher Uwe Beckmann, Durham, NC (US)

(73) Assignee: Cardinal Gibbons High School, Raleigh, NC (US)

( * ) Notice: Subject to any disclaimer, the term of this patent is extended or adjusted under 35 U.S.C. 154(b) by 0 days.

(21) Appl. No.: 14/867,798

(22) Filed: Sep. 28, 2015

(65) Prior Publication Data

US 2017/0090470 A1    Mar. 30, 2017

(51) Int. Cl.
| | | |
|---|---|---|
| *G05D 1/00* | (2006.01) | |
| *F16H 19/04* | (2006.01) | |
| *F16C 1/12* | (2006.01) | |
| *G05D 1/02* | (2006.01) | |
| *B60B 15/22* | (2006.01) | |
| *F41F 1/00* | (2006.01) | |

(52) U.S. Cl.
CPC ............ *G05D 1/0011* (2013.01); *B60B 15/22* (2013.01); *F16C 1/12* (2013.01); *F16H 19/04* (2013.01); *F41F 1/00* (2013.01); *G05D 1/0212* (2013.01); *B60B 2900/351* (2013.01)

(58) Field of Classification Search
CPC .......... B25J 5/005; B60B 15/22; B62D 55/20; F16H 19/04; F41F 1/00; G05D 1/0212
USPC ............................................................ 701/2
See application file for complete search history.

*Primary Examiner* — Maceeh Anwari
(74) *Attorney, Agent, or Firm* — Haynes and Boone, LLP

(57) ABSTRACT

A robotic vehicle is provided with vertical ball cannon and a ball deflector. The ball deflector is mounted over the vertical ball cannon on a vertical linear slide. The deflector redirects a ball shot from the cannon toward a desired target, such as a cylindrical goal. The vehicle further includes a rotating goal-grabber for anchoring a goal adjacent to the vehicle and underneath the output of the deflector. A pair of counter-rotating helical screws capture a ball from the ground and raise it into the ball cannon. The cannon launches the ball toward the deflector, which redirects the ball's upward vertical motion away from the cannon into a downward vertical motion toward the desired target.

19 Claims, 12 Drawing Sheets

US 9,864,369 B2

VERTICAL BALL CANNON WITH SLIDING DEFLECTOR MOUNTED ON MANEUVERABLE ROBOTIC PLATFORM

BACKGROUND OF THE INVENTION

The present invention generally relates to robotic cannons and, in a representatively illustrated embodiment thereof, more particularly relates to a specially designed vertical ball cannon with a sliding deflector structure for a robotic vehicle.

In the construction of small robotic vehicles which manipulate objects, one of the design challenges presented is to provide the vehicle with a capability to vertically launch a smooth ball several feet above the ground and, preferably, into a deflector that deflects the ball's trajectory into a tall cylindrical receptacle. It has been found that attempting to grasp the smooth ball can be difficult, as the smooth surface of the ball may slip out of a mechanical hand. Grasping a ball can also be challenging when there are multiple different sizes of balls. Additionally, when the ball is to be placed into one of several cylindrical receptacles of differing heights, a mechanism is required to allow a mechanical hand to be vertically displaced from the ground (where a ball will be picked up) to above the tallest possible receptacle. A vertical lifting mechanism capable of supporting the weight of a mechanical hand is potentially quite slow, as the hand must be vertically lifted and lowered for each individual ball to be placed into a receptacle.

In view of these design difficulties it can be seen that a need exists for a vertical lifting device, preferably mounted on a robotic vehicle, which provides the capability to rapidly and accurately lift multiple differently-sized balls from the ground and into multiple different-height receptacles. It is to this need that the present invention is primarily directed.

DETAILED DESCRIPTION

Figure 1:
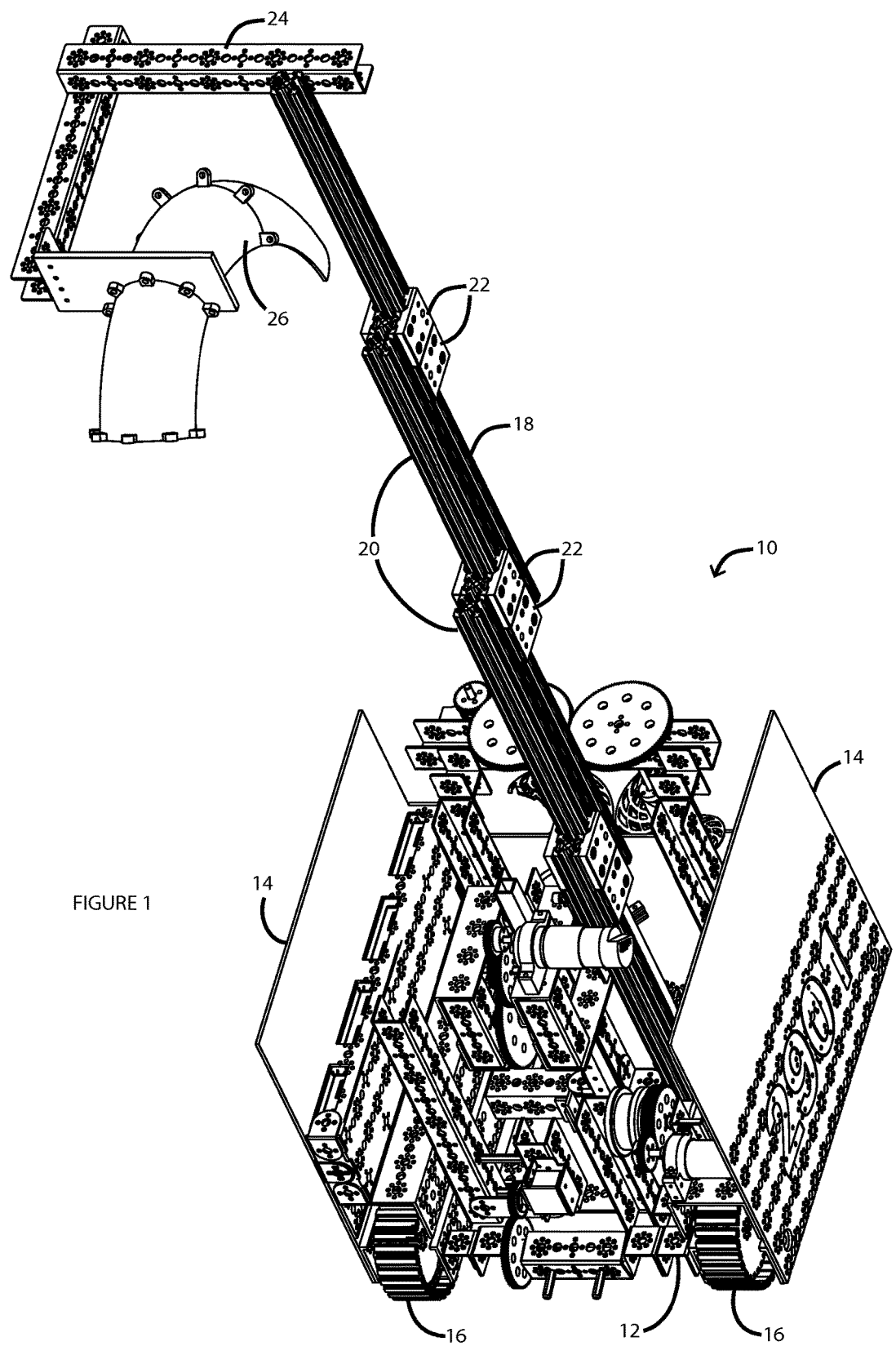
FIG. 1 is a perspective view of an illustrative robotic vehicle provided with a vertical ball cannon and sliding deflector embodying principles of the present invention.

Illustrated in FIG. 1 is a robotic vehicle 10 having a frame 12 supporting a variety of additional components, including sidewalls 14. The frame 12 can drive over varied terrain via a plurality of treaded wheels 16 (representatively four in number). The treaded wheels are advantageously of the type described in co-pending application Ser. No. 13/588,531, whose subject matter is hereby incorporated by reference for all purposes. In some embodiments, however, some wheels may be of a different type, for example, two of the wheels may be omniwheels.

Rising from the frame portion 12 is a mast 18. The mast 18 is preferably composed of multiple segments of rigid metal bar 20 coupled together with metal brackets 22. Each bracket is rigidly fixed, such as with screws, to one metal bar and is slidebly coupled to an adjacent metal bar. In this way, the metal bars of the linear slide can slide relative to one another, thus extending (raising) or collapsing (lowering) the mast. The mast linear slide preferably has four segments as shown, although more or fewer segments are also contemplated.

Attached to the top-most segment of the linear slide is a support brace 24 and a deflector 26. As will be further described below, the deflector 26 is preferably positioned so that one end of the deflector is located vertically above a cannon within frame 12. As the deflector 26 is mounted on mast 18, the deflector 26 can be readily raised or lowered through the action of linear slide. Preferably, when deflector 26 and the linear slide are in the raised position, the deflector is approximately 3 inches above the sidewalls.

Figure 2:
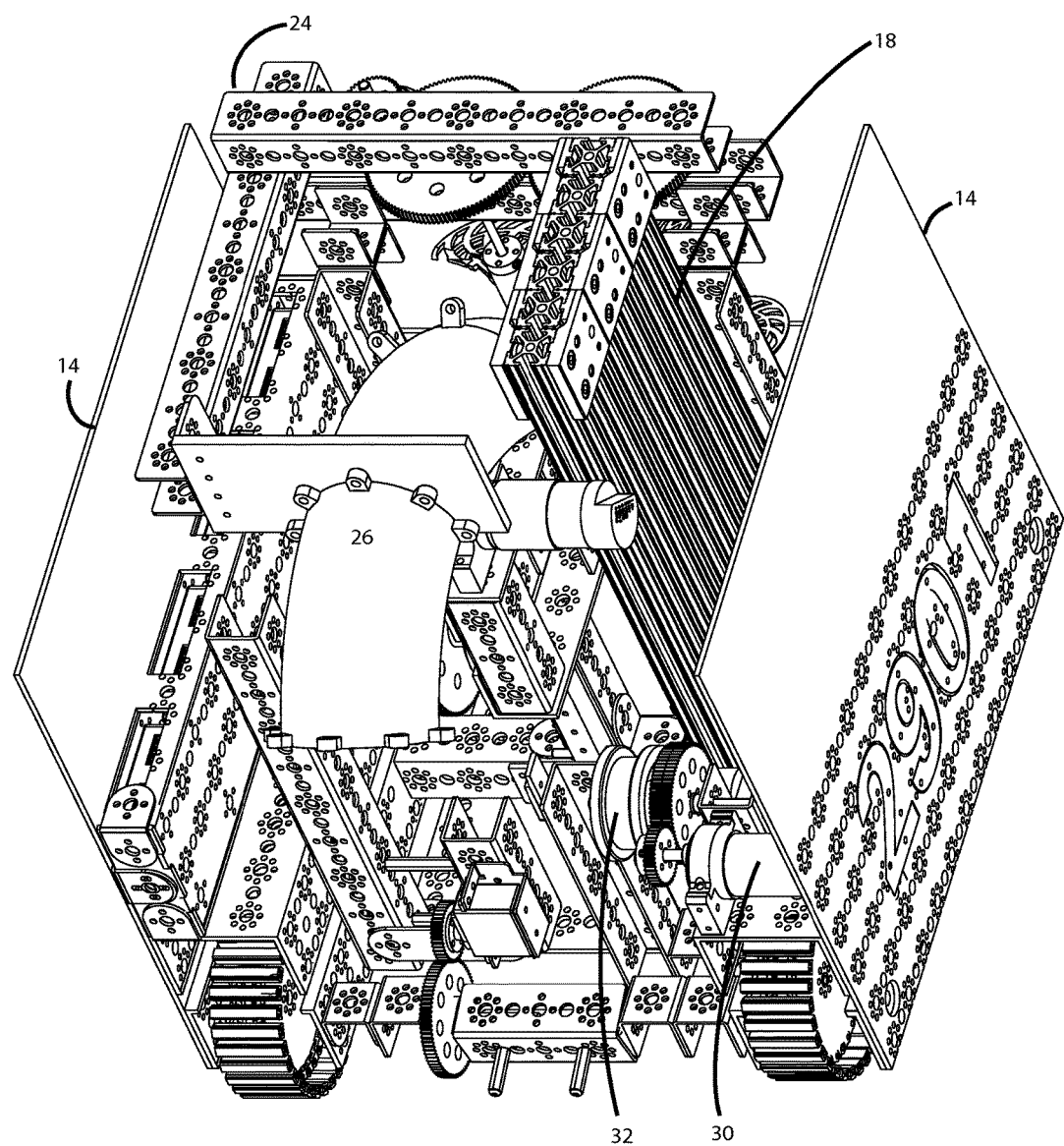
FIG. 2 is a perspective view of an illustrative robotic vehicle showing the sliding deflector in a retracted position.

Illustrated in FIG. 2 is the robotic vehicle 10 with the deflector 26 in its lowered position. Preferably, when deflector 26 and the linear slide are in the lowered position, the deflector 26 and support brace 24 extend only minimally above sidewalls 14. Further preferably, when deflector 26 and the linear slide are in the lowered position, the total vertical height of the robotic vehicle 10 is 18 inches or less.

Also illustrated in FIG. 2 is a mast motor 30 which, through a gear drive, drives a winch 32. The winch 32 spools a flexible cable (not shown) threaded through the segments of mast 18 such that winding the cable on to winch 32 will raise mast 18. Correspondingly, by allowing the force of gravity to pull the mast down, the flexible cable is pulled from the winch 32, thereby resetting the mechanism to raise the mast 18 again.

Figure 3:
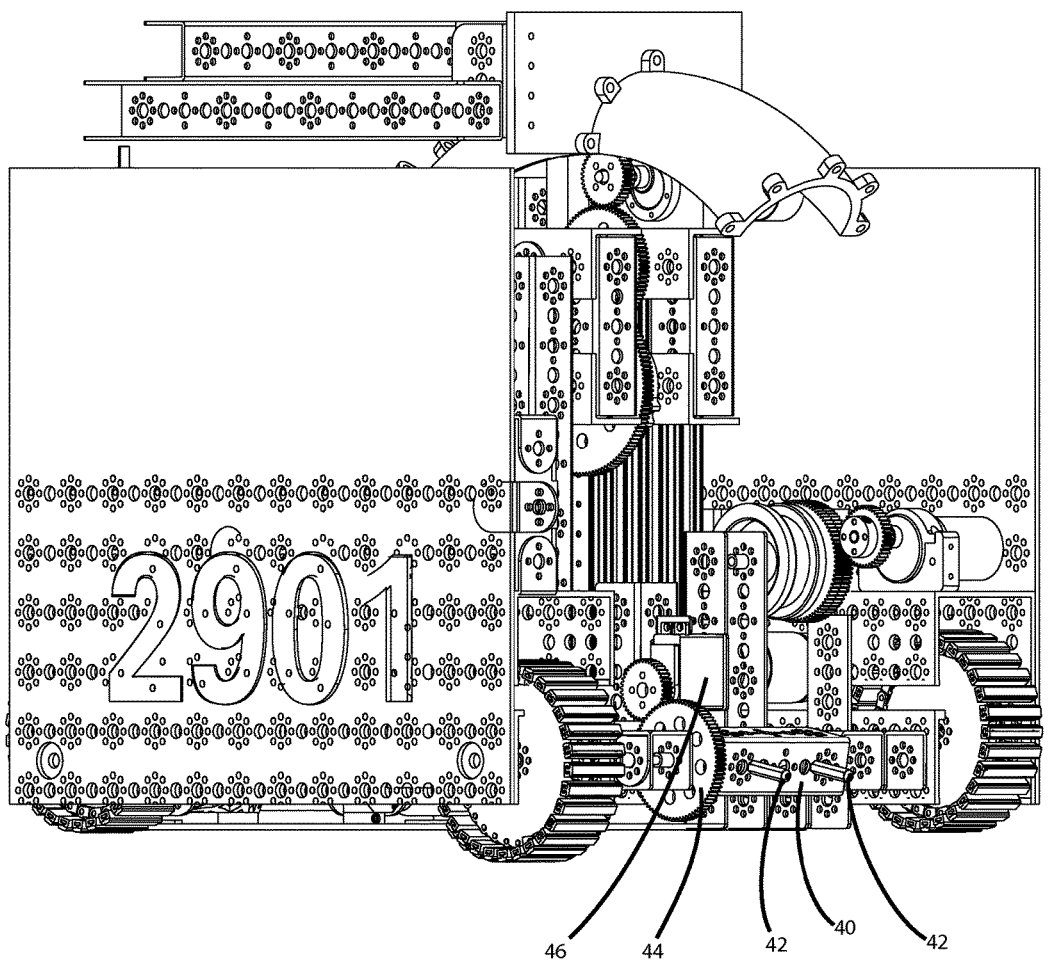
FIG. 3 is a front side view of an illustrative robotic vehicle.

Illustrated in FIG. 3 is the robotic vehicle 10. Located on a front side of the robotic vehicle 10 is a goal post capture bar 40. The goal post capture bar 40 includes two prongs 42 mounted on a rotatable axle. Coupled to the axle is a gear drive 44 and a servo motor 46. The rotation of the servo motor 46, coupled through the gear drive 44, causes the goal post capture bar 40 to rotate, preferably through at least 90 degrees of rotation. In this way, the goal post capture bar 40, shown with prongs 42 pointing forward, may be rotated such that the prongs 42 point downward. Through this rotation action, the prongs 42 may usefully engage the lip of a goal post or other object (not shown), thereby securing the goal post (or other object) in front of the robotic vehicle 10. When the servo motor is rotated in the opposite direction, the prongs 42 will be returned to the forward-pointing position, thereby releasing any previously captured goal post (or other object).

Figure 4:
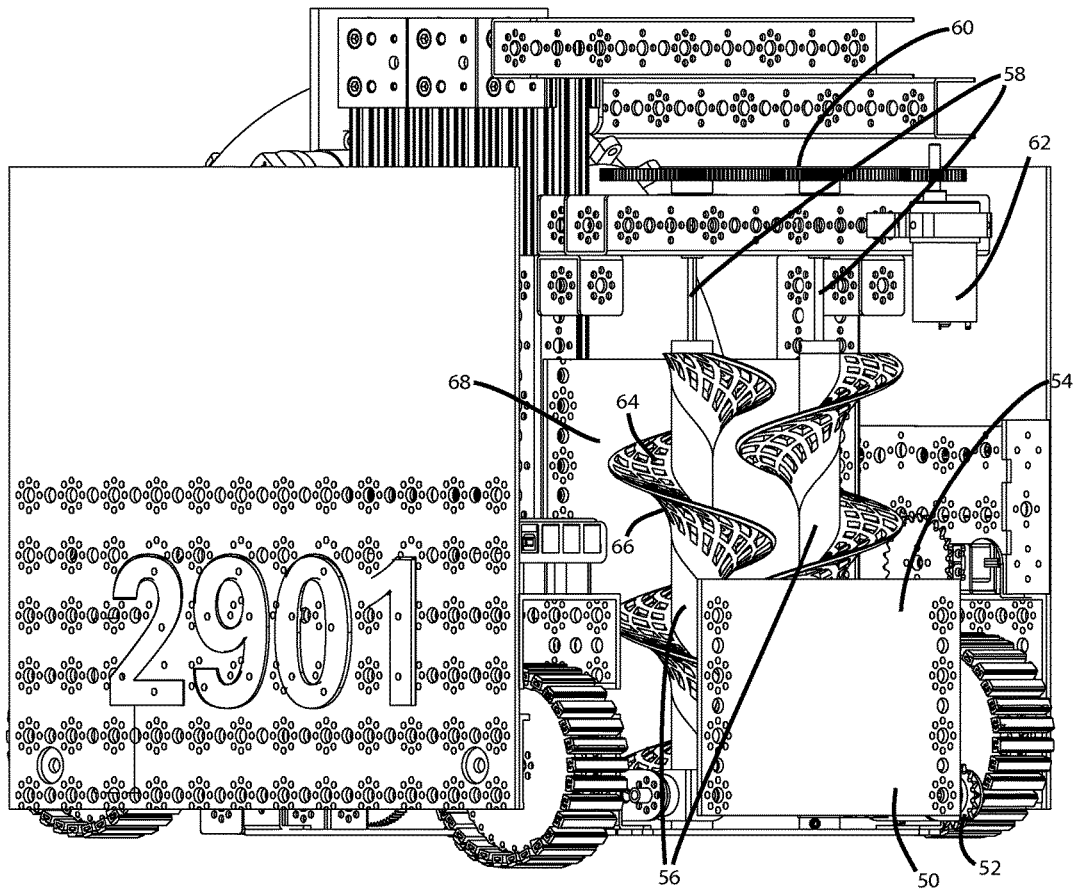
FIG. 4 is a rear side view of an illustrative robotic vehicle.

Turning now to FIG. 4, showing a back-side view of the robotic vehicle 10. Located on the back of the robotic vehicle 10 is a deployable ramp 50 driven through gear drive 52 by a servo motor (not shown). Similar in operation to the goal post capture bar 40, the deployable ramp 50 is rotatable about an axis so that it has a substantially vertical orientation in a closed position, or a generally horizontal orientation in an open position. Preferably in the open position, the deployable ramp 50 is slightly angled such that its leading edge 54 touches, or nearly touches, the ground.

Located just behind deployable ramp 50, and readily accessible when deployable ramp 50 is opened, are twin helical screws 56. The helical screws 56 are vertically mounted in parallel and spaced slightly apart from one another. Each helical screw 56 is configured to rotate about a central axle 58. Coupled to the central axles 58 is a gear drive 60 and motor 62. Preferably, the gear drive 60 includes a first gear coupled to a first axle 58 that engages with a second gear coupled to the second axle 58. In this fashion, the clockwise rotation of one axle is compatible with the anti-clockwise rotation of the other axle. Thus, the helical screws will rotate in opposition directions.

Each helical screw 56 is preferably formed from a lightweight thermoplastic, such as is used in conventional 3-D printing. The shape of each helical screw 56 includes an upper screw surface 64 which, at each point along the helical screw 56, is substantially perpendicular to the axle 58 running through helical screw 56. Thus, the upper screw surface 64 forms a right angle with a central longitudinal axis of helical screw 56. The shape further includes a lower screw surface 66 which is rounded as it approaches the central longitudinal axis of helical screw 56. The shape of each helical screw 56 further preferably includes a pattern of voids or through-holes, such as those shown, to minimize the weight and manufacturing cost of the helical screw 56.

In operation, the twin helical screws 56 rotate continuously. When an object, such as a round ball, is brought up the ramp 50 and into the space between helical screws 56, the action of the rotating screws will push the object against push wall 68. The object will essentially be trapped among the upper screw surfaces 64 of the helical screws 56 and the push wall 68. With the continued rotation of the helical screws 56, the object will be pushed upwardly. When the object reaches the top of helical screws 56 and push wall 68, the object will be lifted over the push wall 68 and drop down on the side opposite the helical screws.

Figure 5:
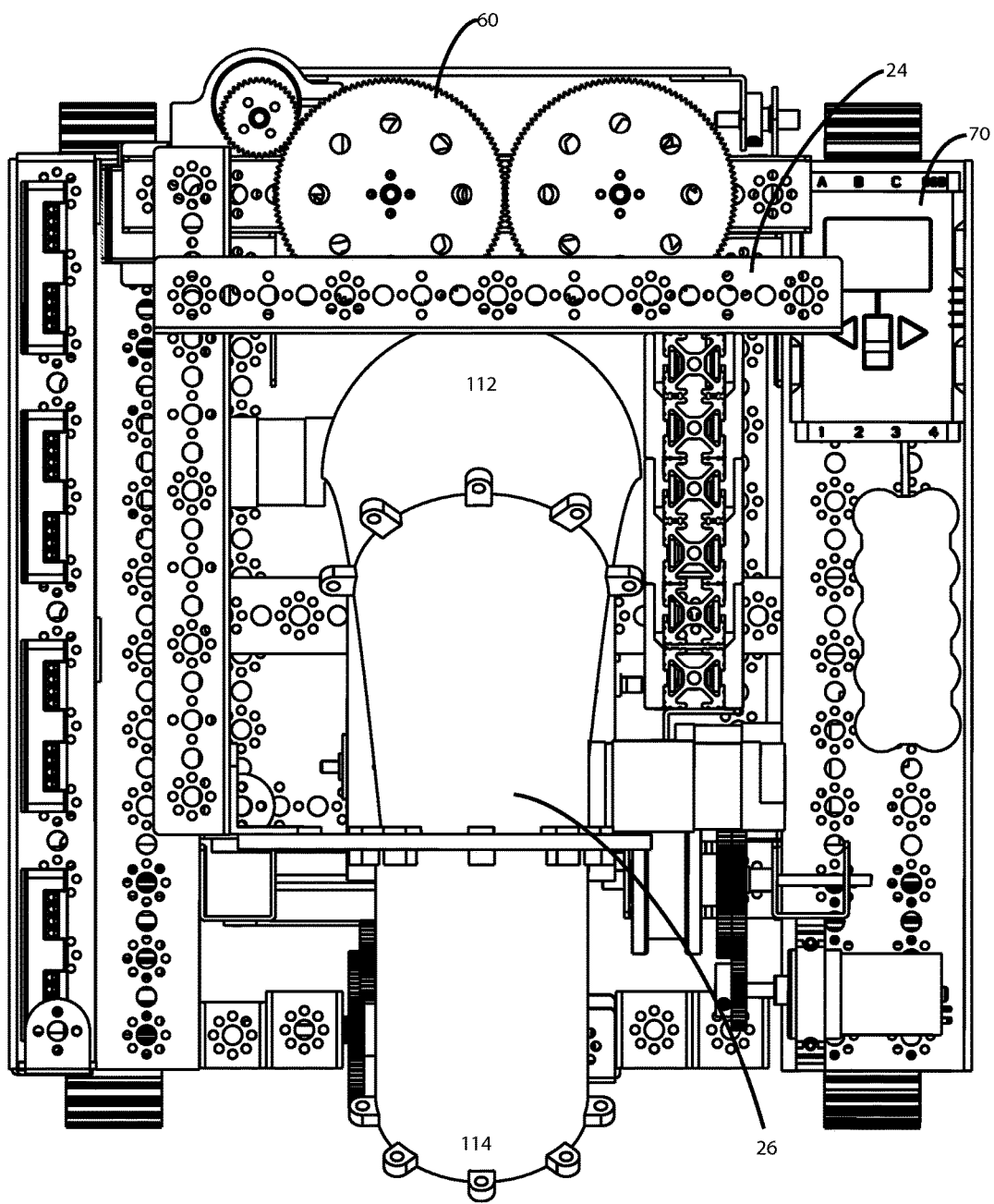
FIG. 5 is a top view of an illustrative robotic vehicle.

Turning now to FIG. 5, illustrated is a top view of the robotic vehicle 10. Visible from the top is programmable controller 70 for controlling the operation of the robotic vehicle 10. The programmable controller 70 produces one or more signals to control the operation of the treaded wheels 16, mast 18, goal post capture bar 40, twin helical screws 56, ramp 50, or other components of the robotic vehicle 10. The programmable controller 70 may also provide control signals for other operations of the robotic vehicle 10. The programmable controller 70 may include a programmable processor and a computer-readable memory storing instructions that, when executed by the programmable processor, produce the one or more signals that control the operation of a motor or servo motor. The computer-readable memory may also be computer-writable. The programmable controller 70 may further include a plurality of input, output, or input/output ports. Thus, the programmable controller 70 may also receive as input signals from one or more sensors located on or in the robotic vehicle 10. In one embodiment, the programmable controller 70 includes a LEGO® MINDSTORMS® NXT Intelligent Brick available (or previously available) from the LEGO Group. The operation and capabilities of the programmable controller 70 are further described below.

Figure 6:
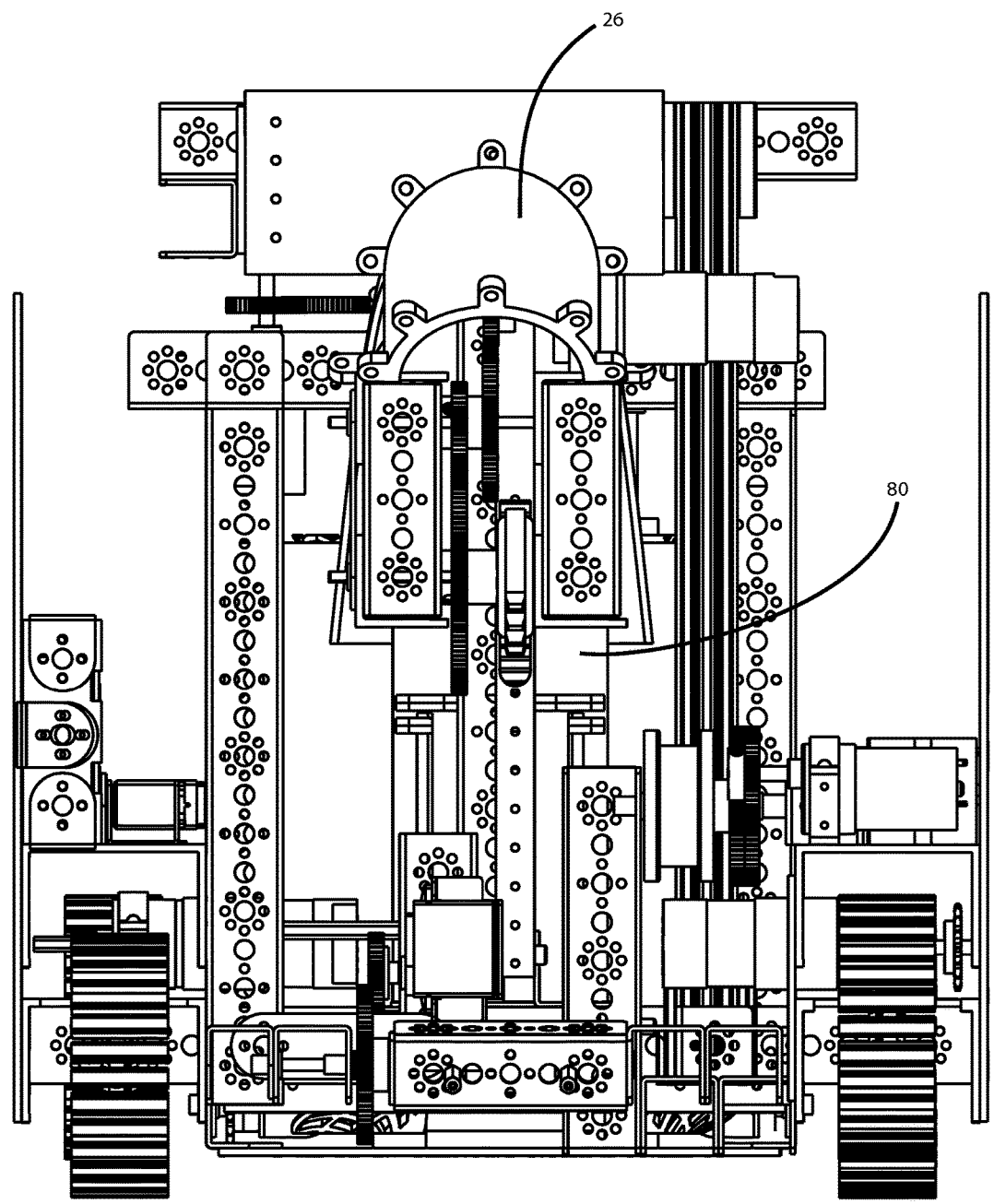
FIG. 6 is a front view of an illustrative robotic vehicle.

FIG. 5 further shows the gear drive 60 for the twin helical screws 56. Also shown is the deflector 26 and support brace 24. As previously described, adjacent to the gear drive 60 and helical screws 56 is a support wall 68, whose view is obscured in the drawing by support brace 24. Thus, when an object is lifted by the twin helical screws 56 over the support wall 68, it will fall into the space directly below the wider end of deflector 26. FIG. 6, showing a front view of robotic vehicle 10, illustrates that located beneath the deflector 26 is a vertical cannon 80.

Figure 7:
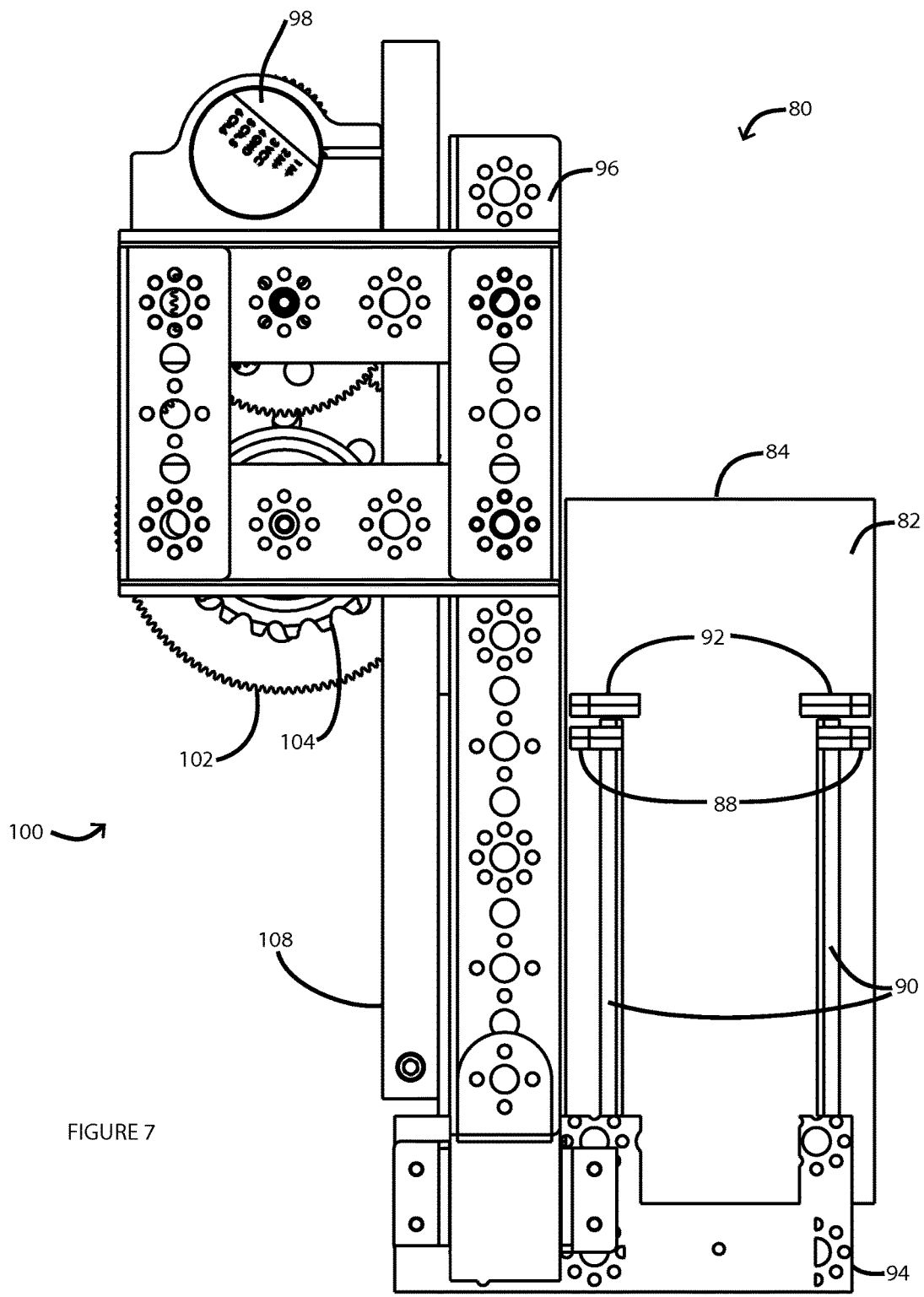
FIG. 7 is a side view of an illustrative vertical cannon.
Figure 8:
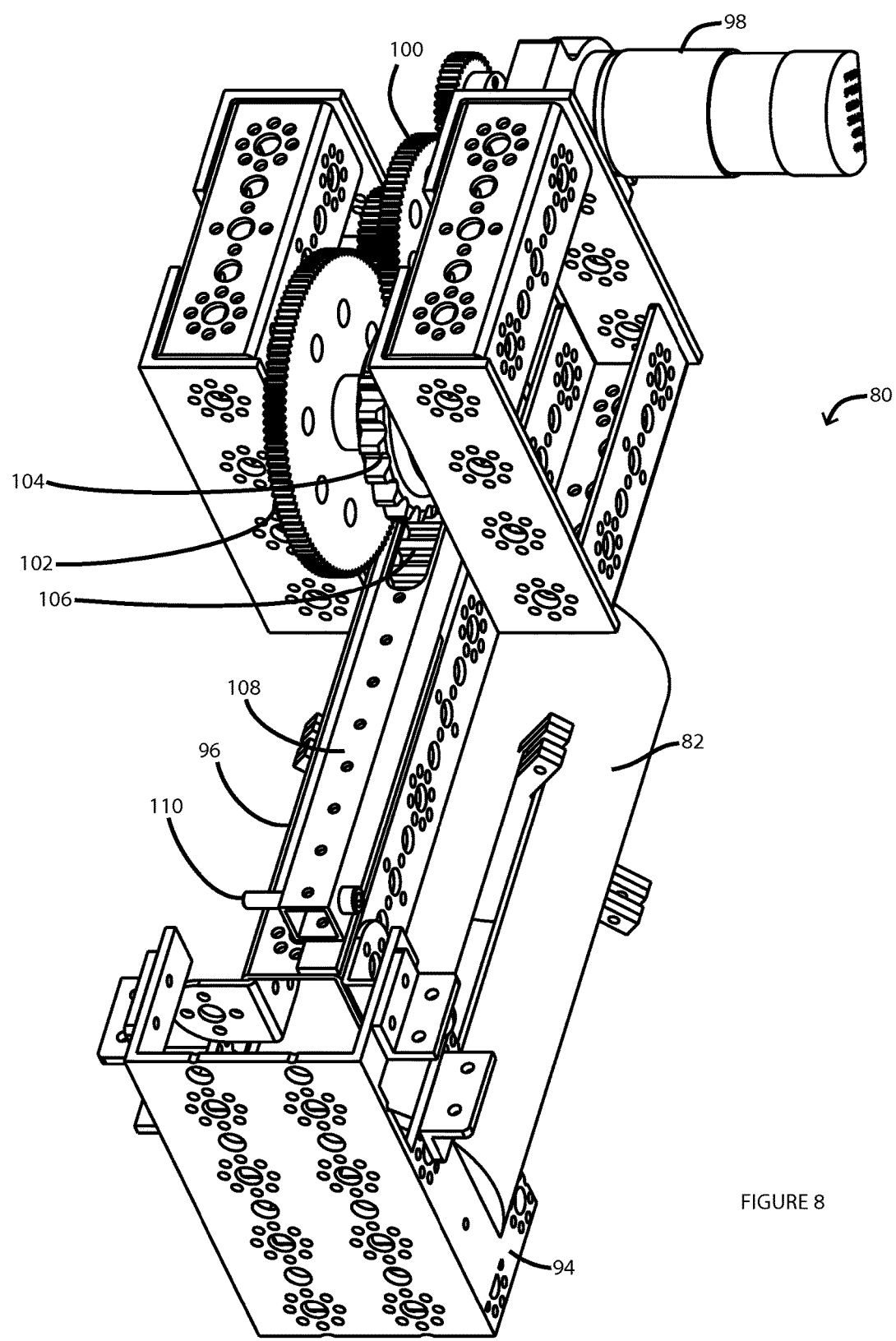
FIG. 8 is a perspective view of an illustrative vertical cannon.
Figure 9:
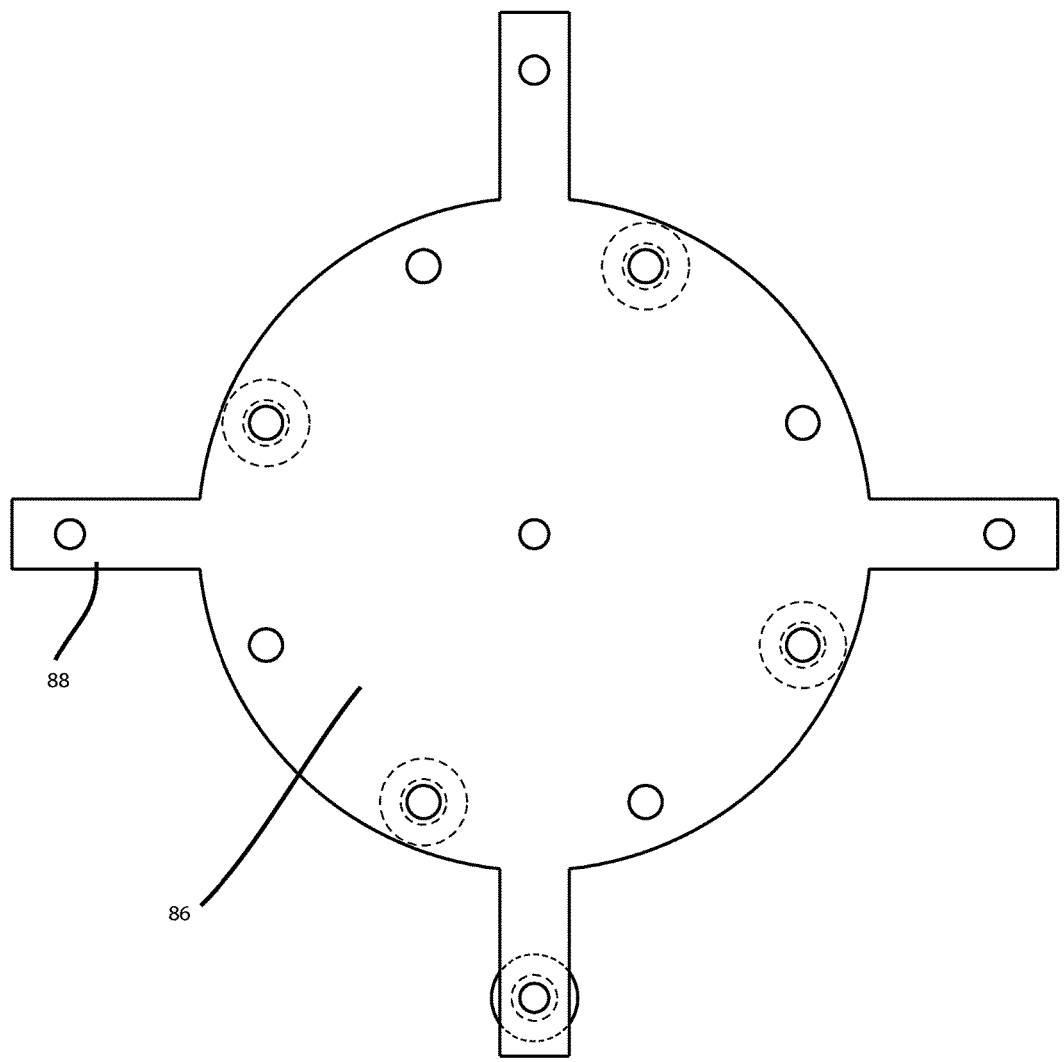
FIG. 9 is a top view of an illustrative launch plate.

The vertical cannon 80 is further illustrated, separately from other components of robotic vehicle 10, in FIGS. 7, 8, and 9. The vertical cannon 80 includes a round barrel 82 with a muzzle opening 84. Within the chamber of the round barrel 82 sits a launch plate 86 that occupies a substantial cross-section of the barrel 82. The launch plate 86 further includes guide tabs 88, which protrude through the round barrel 82 via corresponding linear slots 90 in the round barrel 82. With the guide tabs 88 captively engaged by the linear slots 90, the launch plate 86 is free to slide longitudinally up and down the round barrel 82. At the upper terminus of each linear slot 90 is a fixed tab 92, shown adjacent to each tab 88. One or more of the tabs 88 are coupled to one or more of the fixed tabs 92 via an elastomeric string (not shown), such as a rubber band, surgical tubing, or other similar elastomeric string. In this way, the tab 88 is biased toward the fixed tab 92, and thus the launch plate 86 is biased toward the upper end of the round barrel 82.

The round barrel 82 is securely mounted to a base 94, which also supports a riser 96 adjacent to, and generally parallel with, the round barrel 82. The riser 96 supports the launching mechanism that will cock and release the launch plate 86, thereby launching a ball or other object loaded into the vertical cannon 80. The launching mechanism includes an electric drive motor 98 coupled to a reduction transmission 100. The reduction transmission 100 is shown including a number of gears. The gears of the reduction transmission 100 are selected with smaller gears transmitting power to larger gears, thus reducing the rotational velocity and increasing the torque provided by the electric drive motor 98. At the output of the reduction transmission 100, a final drive gear 102 is axially coupled to a partially-toothed gear 104. The partially-toothed gear 104 differs from an ordinary gear in that at one or more locations around its circumference, it lacks gear teeth that would normally be present in a complete gear. Where the partially-toothed gear 104 does have its gear teeth, those gear teeth engage with a linear gear 106, which is free to slide linearly within square tube 108. The square tube 108 is fixedly mounted to the riser 96. When the partially-toothed gear 104 is rotated such that a portion of its circumference that does not have teeth faces the linear gear 106, there is no engagement between the partially-toothed gear 104 and the linear gear 106. In that orientation, the linear gear 106 is free to slide up or down within the square tube 108. At one end of the square tube 108 is a stop pin 110. A flexible but generally non-stretching cable (not shown) is affixed at one end to the linear gear 106, passes around the stop pin 110, and is affixed at the opposite end to the center of the launch plate 86.

A general description of the operation of the vertical cannon 80 and deflector 26 will now be provided. The electric drive motor 98 turns the reduction transmission 100, causing the partially-toothed gear 104 to rotate until its teeth engage with the linear gear 106, thereby pulling the linear gear 106 up within the square tube 108. This upward movement is transmitted through the cable to the launch plate 86, which is correspondingly pulled down. As the launch plate 86 is pulled down, the elastomeric string coupled between the tabs 88 and the fixed tabs 92 is stretched, exerting an increasing upward force on the launch plate 86. That upward force, however, is countered by the downward force of the cable (transmitted from the electric drive motor as described). As the reduction transmission 100 continues to turn, the partially-toothed gear 104 rotates to a portion of its circumference that lacks teeth. At that point, the partially-toothed gear 104 becomes disengaged from the linear gear 106, and there is no longer a physical coupling between the electric drive motor 98 and the launch plate 86. Thus, there is no longer a force to counteract the upward force on the launch plate 86 exerted by the elastomeric string. The launch plate 86 rapidly accelerates in an upward direction, pulling on the cable and drawing the linear gear 106 downward. If an object, such as a ball, is located in the chamber of the vertical cannon 80, the object will also be rapidly accelerated in an upward direction. When tabs 88 of the launch plate 86 reach the upper terminuses of the linear slots 90, the launch plate 86 is braked by a collision of the tabs 88 and the fixed tabs 92. The downward motion of the linear gear 106 is similarly braked by a collision with the stop pin 110. An object located in the chamber, however, will not encounter a similar collision but will instead continue on an upward trajectory and exit the vertical cannon 80 at the muzzle opening 84. The object will then continue following its upward trajectory through free space.

As the object follows its upward trajectory, it will encounter the deflector 26, which as previously explained, has its wider end located directly over the vertical cannon 80. Thus, the object will strike the deflector's wider end 112 and be guided along the curve of the deflector 26 to the narrow end 114 of the deflector 26. The guide path provided by the deflector 26 will change the object's upward trajectory such that it exits the narrow end 114 of the deflector 26 on a generally downward and horizontal path. By adjusting the height of the deflector 26, as previously described, the height to which an object is launched can be controlled. In this fashion, the vertical cannon 80 and deflector 26 can accurately launch and deliver an object into a container, such as a goal post, located directly in front of the robotic vehicle 10 and having any of a wide variety of heights. As discussed previously, the robotic vehicle 10 includes a goal post capture bar allowing the robotic vehicle to selectively engage with a goal post and affix its location directly in front of the robotic vehicle 10 and in the trajectory of an object launched by the vertical cannon 80 and deflected by the deflector 26.

The electric drive motor 98 may be driven continuously, allowing the partially-toothed gear 104 to alternately engage the linear gear 106 (thereby cocking the launching plate 86) and disengage the linear gear 106 (thereby launching the launching plate 86). In a preferred embodiment, the speed of the electric drive motor 98 and the sizes of the gears of the reduction transmission 100 are selected such that the vertical cannon 80 can cock and launch an object in approximately 1 second.

The operation of the vertical cannon may be synchronized with the operation of the twin helical screws. As previously explained, the twin helical screws 56 rotate continuously, thereby lifting an object, such as a ball, over the push wall 68. After passing over the push wall 68, the object falls into the chamber of the vertical cannon 80. Since the upper and screw surfaces 64, 66 complete approximately three turns along the length of each twin helical screw, the twin helical screws 56 can simultaneously lift multiple objects in series. In a preferred embodiment, the twin helical screws 56 rotate at an angular speed capable of delivering an object over the push wall 68 in time with the operation of the vertical cannon 80. Thus, the twin helical screws and the vertical cannon 80 can operate together to send a rapid-fire stream of objects toward the deflector 26.

Returning now to the description of the programmable controller 70, the software used to control the operation of the robotic vehicle 10 will now be described. The programmable controller 70 includes stored programming allowing the robotic vehicle 10 to be operated in two modes. In an autonomous mode, the robotic vehicle 10 operates in accordance with preprogrammed instructions and without any human input. The operation of the vehicle in autonomous mode is not entirely predetermined, however, as sensor inputs may be processed and influence the operation of the robotic vehicle 10. For example, a distance measurement device may be mounted on a front portion of the robotic vehicle 10 and provide information relating to the forward distance between the robotic vehicle 10 and the nearest object. Based on that distance information, the robotic vehicle 10 may determine whether and where to drive. Additionally, such distance information may be used in other ways, such as to select from a variety of preprogrammed movement routines. Such a decision process is particularly useful when the robotic vehicle 10, or other objects in its surroundings, may be in any of a known number of initial starting locations. By using the distance information, and potentially other sensor inputs, the initial execution routine of the robotic vehicle 10, when in the autonomous mode, can select a next routine to be executed.

In one embodiment, a distance measurement is taken at the beginning of an autonomous mode operation. The measured distance is compared to two fixed values to determine whether the distance is less than a first value, between the first value and a second value, or greater than a second value. Based on the comparison, one of three stored routines is then executed.

The robotic vehicle 10 may also be operated in a human-driver mode. In the human-driver mode, the robotic vehicle 10 operates in accordance with instructions provided by a human, such as through the use of a handheld remote controller equipped with one or more joystick inputs and one or more buttons. The received instructions are passed to a motion program that sends signals to the various motors and servos that comprise the robotic vehicle 10. The instructions are preferably received by the robotic vehicle 10 via wireless communication, such as through an IEEE 802.11 "WiFi" network, Bluetooth connection, Zigbee connection, cellular- or LTE-type network, infrared link, or any other suitable wireless communication technology.

The stored programming on the programmable controller 70 further includes a program allowing for creating an autonomous program by recording human user inputs. This special program, referred as a macro recorder, is operationally similar to the behavior of the robotic vehicle 10 under ordinary human-driver mode. However, the control inputs provided by the human are not only used to operate the motors and servos of the robotic vehicle 10, but the control inputs are also saved sequentially to a file. The data saved to the file may include the length of time a command is given, and optionally, the length of time between commands. Thus, data allow for an accurate replay of the user's inputs.

The macro recorder may optionally store additional information relating to sensor information gathered during the performance of a human's inputted command. For example, the human may give a command to the robotic vehicle 10 to drive forward. Responding to this command, the programmable controller 70 activates one or more motors coupled to the drive wheels 16. Simultaneously, the programmable controller 70 begins to monitor rotational encoder readings from the one or more motors, which provides an indication of the number of rotations the corresponding motor has made. When the human subsequently inputs a stop command (or, similarly, ceases to give the drive forward command), the programmable controller 70 records the information indicating the number of rotations made. By operating in this fashion, the macro recorder can accurately record the effect of the human's inputted command, for example, the distance driven. As described further below, the programmable controller 70 can then later recreate the effect (e.g., drive the same distance) without being influenced by variables such as battery power, motor age, or terrain angle (e.g., whether driving uphill, downhill, or on a flat surface). In some embodiments, the macro recorder may store to the file both the specific human-inputted command and corresponding sensor data indicative of the command's effect.

Figure 10:
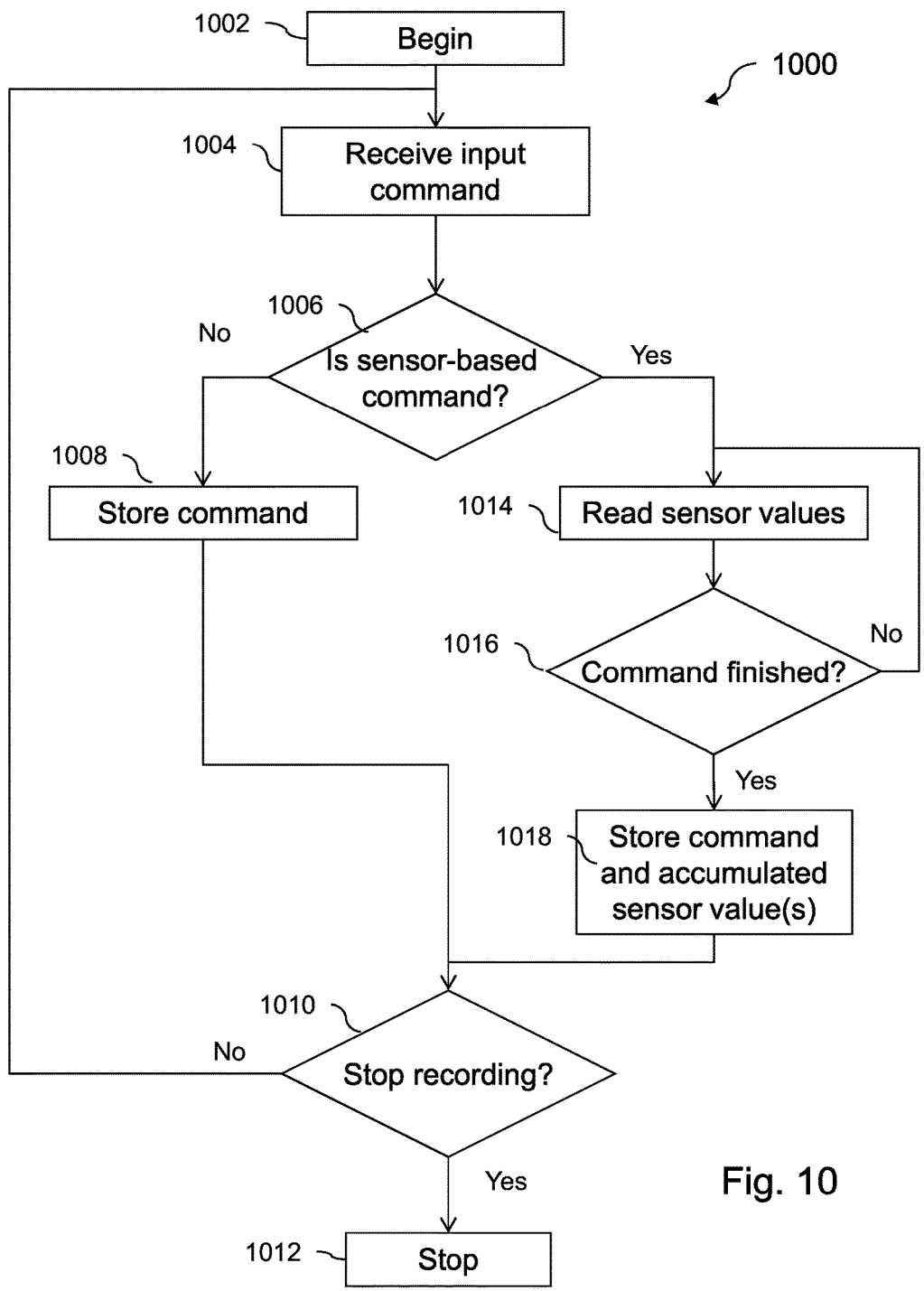
FIG. 10 is a process flow diagram for a method of recording a series of commands.

The operation of the macro recorder is illustrated in FIG. 10. The method 1000 begins in step 1002. In step 1004, an input command is received. In step 1006, it is determined whether the input command is a sensor-based command, that is, whether the command should be recorded together with sensor information relevant to the performance of the command as described above. If not, then in step 1008 the command is stored, and then in step 1010, it is determined whether to stop recording or continue recording. If recording should stop, then the method ends with step 1012. If recording should continue, then the method repeats by returning to step 1004.

If, in step 1006, it is determined that the input command is a sensor-based command, then in step 1014 one or more sensor values are read. Exemplary sensor values include, for example, a rotary motor encoder value and a servo position value. Subsequently in step 1016, it is determined whether the command is finished. If not, then processing returns back to step 1014 for reading additional sensor values. When it is determined in step 1016 that the command is finished, then in step 1018 the command and one or more accumulated sensor values are stored. In some embodiments, a value derived from the sensor values may be stored instead. For example, a difference between a final sensor value and an initial sensor value may be stored.

In steps 1008 and 1018, the storing of commands and sensor values is preferably performed by storing the data in a file. Alternatively, the data may be accumulated in a data structure in memory, such as a list, and written to a file after cessation of recording in step 1012.

The programmable controller 70 can subsequently use the file created by the macro recorder as an input to a playback routine. The commands stored in the file are sequentially read and sent to the motion program as if the commands had been input by a human. In this fashion, the stored commands can be used to reenact the previously recorded movement and operation of the robotic vehicle 10. Where the stored command provides information about the effect of the command, such as the motor encoder readings previously discussed, the playback routine provides the stored command and simultaneously begins to monitor the output of the relevant sensor. When the sensor reading equals the stored sensor value, the command is stopped. By operating in this fashion, the playback routine can accurately recreate the effect of the human's inputted command, for example, the distance driven. The inventors have found that by recording and playing back certain commands, and in particular drive commands, using this sensor-monitoring technique, a significant gain in repeatability and accuracy is obtained relative to other techniques, such as simply recording the length of time a command is given.

Figure 11:
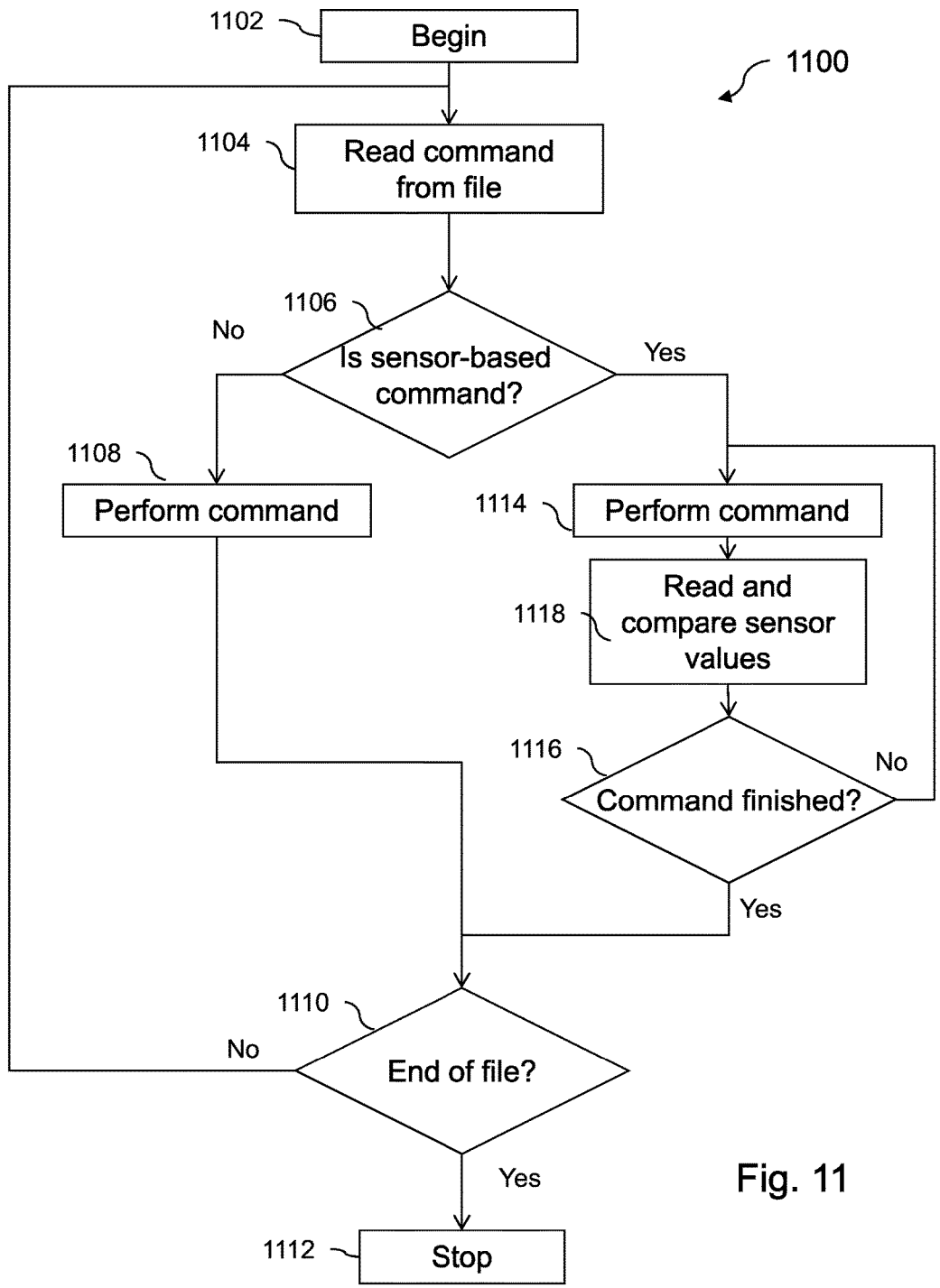
FIG. 11 is a process flow diagram for a method of playing back a series of recorded commands.

Operation of the playback routine is further shown in FIG. 11 illustrating method 1100. The method begins in step 1102. In step 1104, a command is read from a file. In step 1106, it is determined whether the command is a sensor-based command. If not, then in step 1108 the command is performed. Then in step 1110, it is determined whether the end of the file has been reached. If so, then the method ends in step 1112. If not, then processing continues by returning to step 1104.

If in step 1106 it is determined that the command is a sensor-based command, then in step 1114 the command is performed. Next in step 1118, one or more sensor values are read and compared to one or more values provided together with the command. Based on the comparison of the sensor values to the stored values, in step 1116 it is determined whether the command has finished, that is, whether the sensor value read in 1118 is consistent with a target value provided by the command. If the target value has not yet been reached, then processing returns to step 1114. Once the command is determined to be finished in step 1116, then processing continues to step 1110 previously discussed.

Using the macro recorder, it is relatively simple to create a variety of stored programs for controlling the operation of the robotic vehicle 10 that may be used in an autonomous mode. To assist in selecting one of these stored programs, the programmable controller 70 further includes a visual drive selection program that will interpret each stored program and create an animated display on the screen of programmable controller 70.

Figure 12:
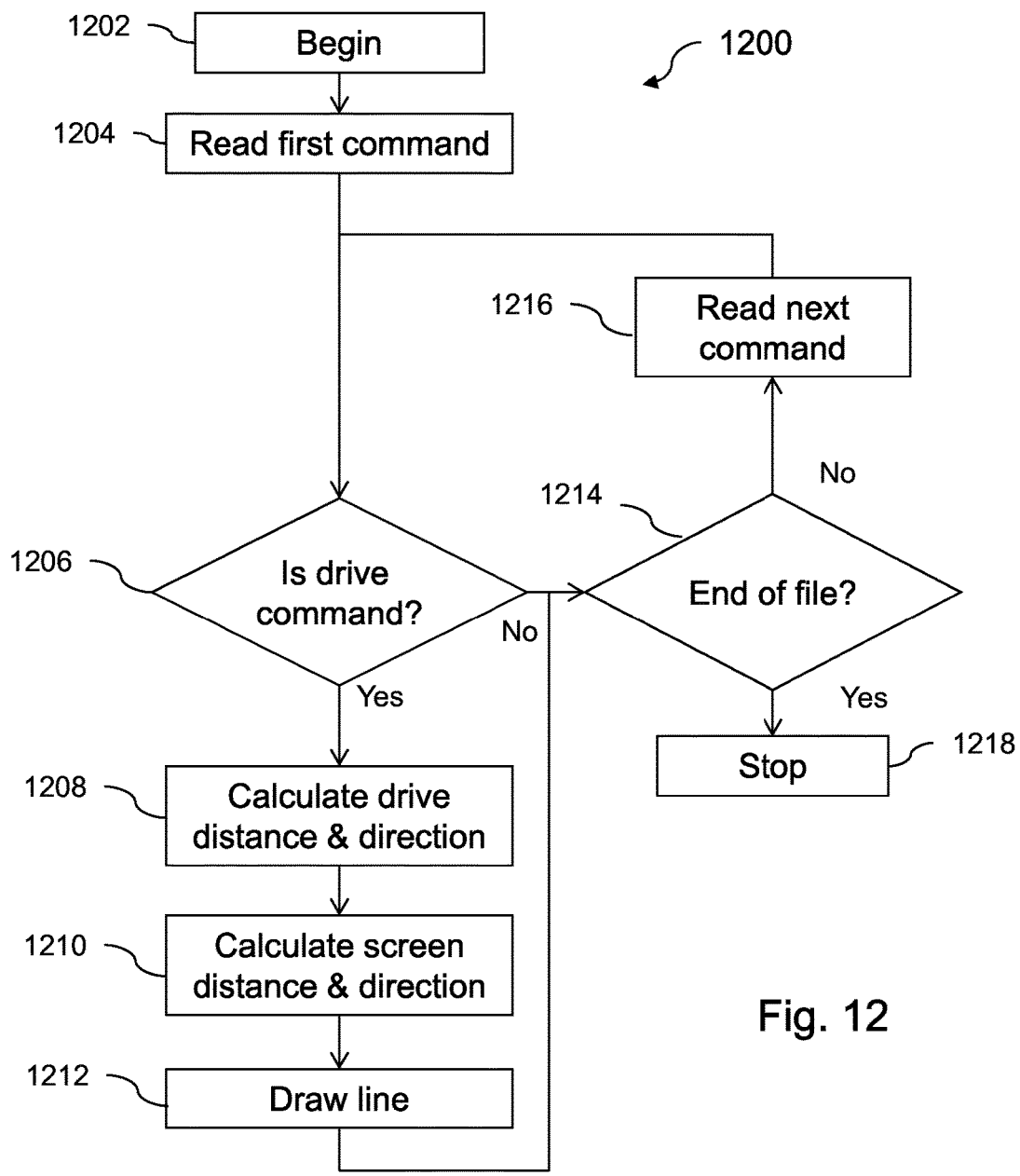
FIG. 12 is a process flow diagram for a method of visually depicting a series of recorded commands.

The method implemented by the visual drive selection program is illustrated in FIG. 12. The method 1200 begins in step 1202. In step 1204, a first command is read from a file. In step 1206, it is determined whether the command is a drive command. If the command is a drive command, then in step 1208 the distance and direction indicated by the drive command is calculated. For example, the drive command may provide that the robotic vehicle 10 should drive forward for two seconds. Thus, information about the robotic vehicle 10's drive speed may be used to calculate an approximate distance that the robotic vehicle would move in two seconds. Alternatively, the drive command may provide that the robotic vehicle 10 should drive forward until a motor encoder sensor indicates that a certain number of motor revolutions have occurred. Thus, information about the distance the robotic vehicle 10 drives with each motor revolution may be used to calculate an approximate distance that the robotic vehicle would move before reaching the targeted count of motor revolutions.

Next, in step 1210, the approximate drive distance and direction calculated in step 1208 is translated into a screen distance and direction. This may be accomplished by applying a fixed distance scaling to map between a real-world distance that the robotic vehicle 10 would travel and a number of pixels on the screen of the programmable controller 70. In one embodiment, the scaling maps a 10' by 10' real world square, over which the robotic vehicle 10 would drive, to a 100 pixel by 64 pixel display. For example, if the robotic vehicle is assumed to start at the bottom center of the display and facing toward the top of the display, then a command to drive forward approximately two feet would map to 2 ft*(64 pixels/10 ft)=13 pixels.

Next, in step 1212, a line corresponding to the calculation of step 1210 is drawn on the display of the programmable controller 70. In one embodiment, the line is drawn from an initial starting point (or, after the first line is drawn, from the previously drawn line) slowly enough for the drawing technique to be humanly perceptible. In this fashion, the line is drawn such that it visually represents the path the robotic vehicle 10 would take in performing the drive command.

The process then proceeds to step 1214, where it is determined whether the end of the file has been reached. If so, then the process ends in step 1218. If the end of the file has not been reached, then the process continues in step 1216 where a next command is read in. Subsequently, the process returns to step 1206, previously described.

If in step 1206 the command is determined not to be a drive command, then processing continues to step 1214.

The foregoing detailed description is to be clearly understood as being given by way of illustration and example only, the spirit and scope of the present invention being limited solely by the appended claims.

What is claimed is:

1. Robotic vehicle apparatus comprising:
    a platform including a plurality of wheels;
    an anchor comprising:
        a horizontal bar mounted on a rotatable axle; and
        at least one prong extending outwardly from the horizontal bar;
    a first helical screw and a second helical screw, each helical screw being rotatable about a central longitudinal axis of the helical screw, wherein a first helical screw and the second helical screw are rotationally coupled via a one or more gears such that when the first helical screw rotates in a clockwise direction the second helical screw rotates in a counter-clockwise direction;
    a motor rotationally coupled to the first and second helical screws via the one or more gears;
    a vertically-oriented cannon comprising:
        a vertically-oriented tube having an opening at an upper end;
        a movable plate enclosing the tube at a lower end;
        at least one fixed tab;
        an elastomeric band coupling the movable plate to the at least one fixed tab to exert an upwardly biasing force on the movable plate;
        a linear gear;
        a non-elastomeric cable coupling the movable plate to the linear gear such that a force exerted on the linear gear in at least one direction is transferable through the cable to exert a corresponding force on the movable plate;
        a partially-toothed gear having at least one toothed portion and at least one untoothed portion about its circumference, the at least one toothed portion being arranged to engage the linear gear and the at least one untoothed portion being arranged not to engage the linear gear; and
        a motor coupled to the partially-toothed gear via a geared transmission; and
    a deflector mounted on vertically-oriented linear slide.

2. The robotic vehicle apparatus of claim 1 further comprising a programmable controller mounted on the platform.

3. The robotic vehicle apparatus of claim 2 in which the programmable controlled is programmed to cause the operation of the robotic vehicle apparatus to:
    activate the range detector to measure an open distance from the robotic vehicle apparatus in a particular direction;
    determine whether the open distance is equal to or below a first threshold, above the first threshold and equal to or below a second threshold, or above the second threshold;
    select a stored routine for execution based on an outcome of the determine step.

4. The robotic vehicle apparatus of claim 3 in which the programmable controller is further programmed to cause the operation of the robotic vehicle apparatus to:
    if the open distance is equal to or below the first threshold, engage a first routine stored in the programmable controlled to cause the robotic vehicle to autonomously drive to a first location;
    if the open distance is above the first threshold and equal to or below the second threshold, engage a second routine stored in the programmable controlled to cause the robotic vehicle to autonomously drive to a second location;
    if the open distance is above the second threshold, engage a third routine stored in the programmable controlled to cause the robotic vehicle to autonomously drive to a third location.

5. The robotic vehicle apparatus of claim 2, wherein the programmable controller is programmed to:
    receive a sequence to user inputs corresponding to a set of driving commands, the set of driving commands including at least a forward command and a turn command; and
    record the sequence of user inputs to a file.

6. The robotic vehicle apparatus of claim 5 wherein the record step comprises recording a motor encoder value indicative of an amount of angular rotation of a motor.

7. The robotic vehicle apparatus of claim 5 wherein the record step comprises recording a joystick value and a time duration.

8. The robotic vehicle apparatus of claim 5 wherein the programmable controller is further programmed to:
    retrieve a stored command from a file, the stored command corresponding to a driving command;
    drive the robotic vehicle apparatus in accordance with the stored command.

9. The robotic vehicle apparatus of claim 8 wherein the drive step comprises monitoring a motor encoder value indicative of an amount of angular rotation of a motor.

10. The robotic vehicle apparatus of claim 9 wherein the drive step further comprises comparing the monitored motor encoder value to the recorded motor encoder value.

11. The robotic vehicle apparatus of claim 8 wherein the drive step comprises spoofing a joystick input to a motion control program.

12. The robotic vehicle apparatus of claim 2 in which the programmable controller is capable of storing a plurality of programs for controlling the wheels, thereby driving the robotic vehicle apparatus, the robotic vehicle apparatus further comprising:
    a display mounted on the programmable controller;
    wherein the programmable controller is programmed to cause the display to provide an animated user interface depicting a driving route corresponding to a selected program stored in the programmable controller.

13. The robotic vehicle apparatus of claim 2 in which the programmable controller includes a wireless communication interface.

14. The robotic vehicle apparatus of claim 13 in which the wireless communication interface is an IEEE 802.11 interface.

15. The robotic vehicle apparatus of claim 1 wherein the wheels comprise two omniwheels and two treaded wheels.

16. The robotic vehicle apparatus of claim 1 wherein the linear slide further comprises a motor, a pulley, and a cable arranged such that a rotation of the motor causes the cable to wind onto the winch, thereby raising the linear slide.

17. The robotic vehicle apparatus of claim 1 wherein the linear slide further comprises a motor, a pulley, and a cable arranged such that a rotation of the motor causes the cable to wind onto the winch, thereby raising the linear slide.

18. The robotic vehicle apparatus of claim 1 wherein the first and second helical screw operate in synchrony with the cannon motor.

19. The robotic vehicle apparatus of claim 1 wherein the anchor further comprises a servo motor.

* * * * *